United States Patent [19]
Huss et al.

[11] Patent Number: 5,300,848
[45] Date of Patent: Apr. 5, 1994

[54] DUAL PERMANENT MAGNET GENERATOR PLANETARY GEAR ACTUATOR AND ROTOR PHASE SHIFTING METHOD

[75] Inventors: John B. Huss, Rockford; Merle L. Bennett, Cherry Valley; Richard J. Hoppe, Rockford, all of Ill.

[73] Assignee: Sundstrand Corporation, Rockford, Ill.

[21] Appl. No.: 436,034

[22] Filed: Nov. 14, 1989

[51] Int. Cl.$^5$ .................. H02K 7/06; H02K 16/00; F16H 3/44
[52] U.S. Cl. .................................... 310/83; 74/395; 310/191; 475/154; 475/157; 475/290
[58] Field of Search ............... 74/99 A, 395; 475/7, 475/10, 16, 150, 151, 154, 156, 157, 252, 264, 265, 290, 294, 299, 325, 338, 900; 310/83, 112, 113, 191

[56] References Cited

U.S. PATENT DOCUMENTS

| | | | |
|---|---|---|---|
| 2,446,393 | 8/1948 | Russell | 318/375 |
| 2,824,275 | 2/1958 | Kober | 322/27 |
| 2,978,621 | 4/1961 | Martinek | 318/374 |
| 3,192,422 | 6/1965 | Kober | 310/191 |
| 3,233,133 | 2/1966 | Kober | 310/191 |
| 3,407,680 | 10/1968 | Westmoreland | 310/112 |
| 3,713,015 | 1/1973 | Frister | 322/28 |
| 3,829,726 | 8/1974 | Nilsson | 310/83 |
| 4,305,031 | 12/1981 | Wharton | 322/29 |
| 4,476,395 | 10/1984 | Cronin | 310/59 |
| 4,607,180 | 8/1986 | Stoody | 310/80 |
| 4,654,577 | 3/1987 | Howard | 322/28 |
| 4,663,581 | 5/1987 | Glennon | 322/52 |
| 4,691,119 | 9/1987 | McCabria | 307/84 |
| 4,728,841 | 3/1988 | Sugden | 310/114 |
| 4,832,658 | 5/1989 | Hendershot et al. | 74/395 X |
| 4,879,484 | 11/1989 | Huss | 310/114 |
| 4,951,518 | 8/1990 | Hendershot | 74/395 |

FOREIGN PATENT DOCUMENTS

| | | | |
|---|---|---|---|
| 61-236950 | 10/1986 | Japan | 475/154 |
| 61-236951 | 10/1986 | Japan | 475/157 |

*Primary Examiner*—David H. Brown
*Attorney, Agent, or Firm*—Antonelli, Terry, Stout & Kraus

[57] ABSTRACT

A dual permanent magnet generator (10) is provided with a differential gear arrangement (20) comprising two ring gears (21, 26), two planetary gears (30, 31) and a carrier (32) which is splined to an input shaft (12) in the generator (10) so as to rotate the carrier (32) at the same speed as the input shaft (12) while allowing the input shaft (12) to shift axially. One of the ring gears (21) has a threaded connection (18, 38) with the input shaft (12). Consequently, as either the ring gear (21) or the ring gear (26) is slowed down through the application of a resistive load on small generators (22, 23 and 27, 28) associated with the respective ring gears (21, 26), the threaded connection (18, 38) will cause the input shaft (12) to move axially in one of two directions and, via lefthand and righthand spline connections (15, 16) between the input shaft (12) and main rotors (13, 13'), cam the rotors (13, 13') to shift into and out of phase with respect to each other.

25 Claims, 5 Drawing Sheets

DUAL PERMANENT MAGNET GENERATOR PLANETARY GEAR ACTUATOR AND ROTOR PHASE SHIFTING METHOD

TECHNICAL FIELD

The present invention relates to a dual permanent magnet generator (PMG) planetary gear actuator and, more particularly, to a dual PMG planetary gear actuator in which two main rotors of the actuator can be phase shifted relative to each other while utilizing the least amount of power and weight.

BACKGROUND ART

Prior to the development of PMG's, aircraft typically used wound field generating systems as a power supply. With weight and size considerations becoming of increased importance, however, PMG devices of the type shown in U.S. Pat. Nos. 4,305,031 and 4,654,577 were developed. These generators were considered relatively small and lightweight devices for generating electrical power from a motive power source because they do not require a separate electrical power source for field excitation.

A PMG does not require a complex cooling apparatus and eliminates the need for a converter by driving the system with a constant speed drive to limit the maximum voltage excursion in the case of a system fault. The output voltage of a PMG is, however, a function of the relative speed between the rotor and stator and of the current drawn by a load. This drawback has prevented PMG's from being used as a main power source in aircraft in lieu of wound field machines having exciters and rotating rectifiers driven at high speed. These high speeds required complex cooling apparatus to dissipate heat developed on the windings and in the rotating rectifiers.

When used in a generator, there is a set voltage on the generator which varies as the load varies and which cannot be controlled electronically. It has been found that the rotors in PMGs create a voltage control problem as the load varies. A dual permanent magnet generator concept controls voltage by shifting two high speed rotors in and out of phase to keep the voltage constant as the load varies. For example, at a 2 per unit (P.U.) load, the magnetic poles are lined up, whereas at no load, the magnetic poles would be 78° out of phase as previously noted. If the main high speed rotors of the PMG which, at no load, are out of phase with each other by about 78° were kept in the same phase relationship as the generator load is increased, the output voltage would droop.

An alternating current generator having a twin permanent magnet rotor which is adjustable in response to output voltage is known from U.S. Pat. No. 3,713,015. As disclosed therein, only one rotor was actuated using a lever to force sliding motion for achieving a relative rotation of the rotors. This known arrangement involved considerable friction and therefor required significant power for overcoming inertia to angularly adjust the rotors.

Another PMG system utilized a plurality of movable stator winding disks disposed in a plurality of air gaps intermediate the magnetic structure. Stator windings were disposed on the winding disks with the respective winding phases connected to one another in series. This system required many bearings to permit movement of the disks relative to the housing and a complex interconnection scheme for the stator windings.

Another PMG system used two radial flux magnetic structures on a rotor for producing first and second magnetic fields with one of the structures movable relative to the other by means of an actuator. Stator windings on the first and second magnetic fields developed output voltage as a result of relative rotation. The output voltage magnitude was controlled by varying the placement of one field relative to another field. This system required the actuator to be on the rotor, and this requirement rendered the actuator complex, large and expensive. A phase-controlled rectifier bridge was used but was relatively complex due to the necessity of having substantial controls to accurately fire the controlled rectifiers in the bridge at appropriate points in the output power waveform to develop DC output power. A relatively large filter had to be connected to the output of the bridge to provide smoothing, and this filter had to have means for dissipating heat developed in the filter components U.S. Pat. No. 4,663,581 shows such a voltage regulated PMG system in which outputs of two or more radial flux PMG's are combined and adjusted relative to each other to regulate output voltage. This system was intended to avoid drawbacks in the aforementioned PMG systems by requiring relatively few bearings, avoiding complex interconnection between the stator windings and the need for an actuator on the rotor, and providing a high power density machine of smaller size and weight for a given output power rating which can be driven at high speeds without substantial cooling. This system required a hydraulic positioning actuator to adjust the position of one stator relative to another in accordance with the magnitude of a control signal from a control circuit.

U.S. Pat. No. 4,728,841 also discloses a dual PMG system in which two relatively movable permanent magnet rotor assemblies are disposed in side-by-side relation to regulate voltage in response to generator loading changes or to compensate for changes in the rate of rotor rotation. This PMG incorporated a differential with first and second ring gears but utilized a more complex arrangement of the rotor body assemblies which can use rotor bodies of different mass or equal mass but which require control units of relatively complex construction, such as an hydraulic actuator with a double-acting piston of the type shown in U.S. Pat. No. 4,654,577. Such actuators add undesirably to the size, weight and complexity of the PMG system and detract from its power and reliability.

A PMG system using lefthand and righthand helical ball splines to effect adjustment of rotors relative to each other is disclosed in copending U.S. application Ser. No. 208,114, filed Jun. 17, 1988, now U.S. Pat. No. 4,879,484. This system comprises a stator having an output winding for producing an output voltage, a rotor within the stator, the rotor including first and second magnet rotors rotatable about a common axis and a mechanism for angular adjusting the first and second rotors relative to one another about the common axis. The angular adjustment of the rotors provides for rotation of each of the first and second rotors in opposite direction relative to the other for causing a relative angular adjustment of the rotors. Rotating each rotor simultaneously in opposite directions by half the required angle requires much less power to overcome inertia than rotating only one rotor the full angle. This simultaneous rotation of each of the rotors a like amount in opposite directions during a relative angular adjustment is accomplished using a common drive shaft extending along the common axis of the rotors for rotatably driving both the first and second rotors about the common axis. Left-and righthand helical ball splines are located between the driven shaft and the first and second rotors, respectively. Rotation of the first and second rotors in opposite directions relative to one another is accomplished by causing axial movement of the drive shaft along the common axis relative to the rotors. In that particular system, bearings are provided for rotatably supporting the rotors at essentially fixed locations along the common axis, and the drive shaft is permitted to move axially along the common axis relative to the rotors for angular adjustment of the rotors. However, the means for axially moving the drive shaft comprises a hydraulic drive means or an electric motor. In either case, the use of the oppositely directed helical ball splines together with the axial movement of the single drive shaft, reduces the friction required for angular adjustment of the rotors and thereby reduces the power necessary for accomplishing the adjustment.

A substantial problem with a PMG used, for instance in aircraft installations where weight is critical, has been until up to now how to actuate these high speed rotors in and out of phase while utilizing the least amount of power and weight. It was found necessary to use external power to actuate the rotors as described in detail above.

DISCLOSURE OF INVENTION

An object of the present invention is to provide, for a dual PMG, a gear actuator for a dual PMG which overcomes the problems and disadvantages encountered in the prior art.

A further object of the present invention is to eliminate the use of hydraulic pistons, electric motors and the like to control movement of PMG rotors into and out of phase with respect to each other and thereby also eliminate the need for pumps and inverters.

An object of the present invention is to provide a compact differential gear system and a simple controller in which pumps for hydraulic pistons and inverters for electric motors are unnecessary.

Another object of the present invention is the extraction of actuation power for phase shifting of the PMG rotors from a rotating shaft without the need for an external power source to permit the actuator to be more lightweight and to avoid using more power than necessary.

The foregoing objects have been achieved in accordance with the present invention by performing actuation of the high speed rotors through extraction of power from the main generator shaft through a planetary gear actuator system rather than by adding power from an external source such as an electric motor or hydraulic pump.

According to one embodiment of the present invention, two main permanent magnet rotors are driven at high speed by an input shaft using lefthand and righthand helical splines or ball splines. A 2 planet/2 ring gear differential has a carrier coupled to the input shaft by a spline. One of the rings of the differential gear system is connected to the input shaft through an acme thread or, alternatively, through a ball screw or any other form of rotary-to-linear translation. A brake in the form of, for example a small generator with stator and permanent magnet rotor is associated with each ring gear.

During steady state operation in which there is no load on the PMG the entire differential rotates along with the input shaft without relative rotation therebetween. When, for example, the load goes to 1 per unit (P.U.), the input shaft must move axially in relation to the main rotors so that the lefthand and righthand helical splines can drive the rotors into phase. In accordance with the present invention, this axial movement is effected by extracting power from the shaft through the application of a resistive load to one of the small generators associated with the ring gears or through the application of another type of braking force. The resulting drag on one or the other of ring gears will cause, through the differential gear system and mating acme threads on the differential and input shaft, to force the input shaft to move axially. Now during a transient state going, say, from 1 P.U. load to no load, a resistive load is placed on the other small generator so that the drag slows the rotational speed of the associated ring gear and causes the input shaft to move axially in the opposite direction to bring the rotors out of phase.

The foregoing arrangement allows actuation of the high speed main rotors utilizing the minimum amount of power and weight by extracting power from the actuator itself by means of the rotating shaft rather than by adding power from another and more complicated source such as an hydraulic actuator. As a result, the actuator of the present invention results in a more simplified control and compact differential. Furthermore, the principles of the present invention are equally applicable to PMG arrangement which are in line and also side by side.

In an alternative arrangement, one of the small generators associated with the ring gears can be replaced by a spiral coil spring. When a resistive load is placed on the remaining small generator, the spring is wound up and energy stored therein. When actuation in the opposite direction is needed, the resistive load is removed from the generator and the stored energy in the spring causes it to unwind, rotating the ring gears in the opposite direction.

According to another embodiment in accordance with the present invention, the spiral coil spring can be replaced by clutches or frictional devices. The essential feature of any such device is that it be simple in operation and compact in construction.

BRIEF DESCRIPTION OF THE DRAWINGS

These and other features, objects and advantages of the present invention will become more apparent from the following description of the best mode for carrying out the invention when taken in conjunction with the accompanying drawings in which:

FIG. 2 is an enlarged cross sectional view of the left side of the generator of FIG. 1 showing details of the actuator where power is extracted from the system to actuate shifting of the rotors and FIG. 2A illustrates a fragmentary view of an alternative embodiment;

BEST MODE FOR CARRYING OUT THE INVENTION

Figure 1:
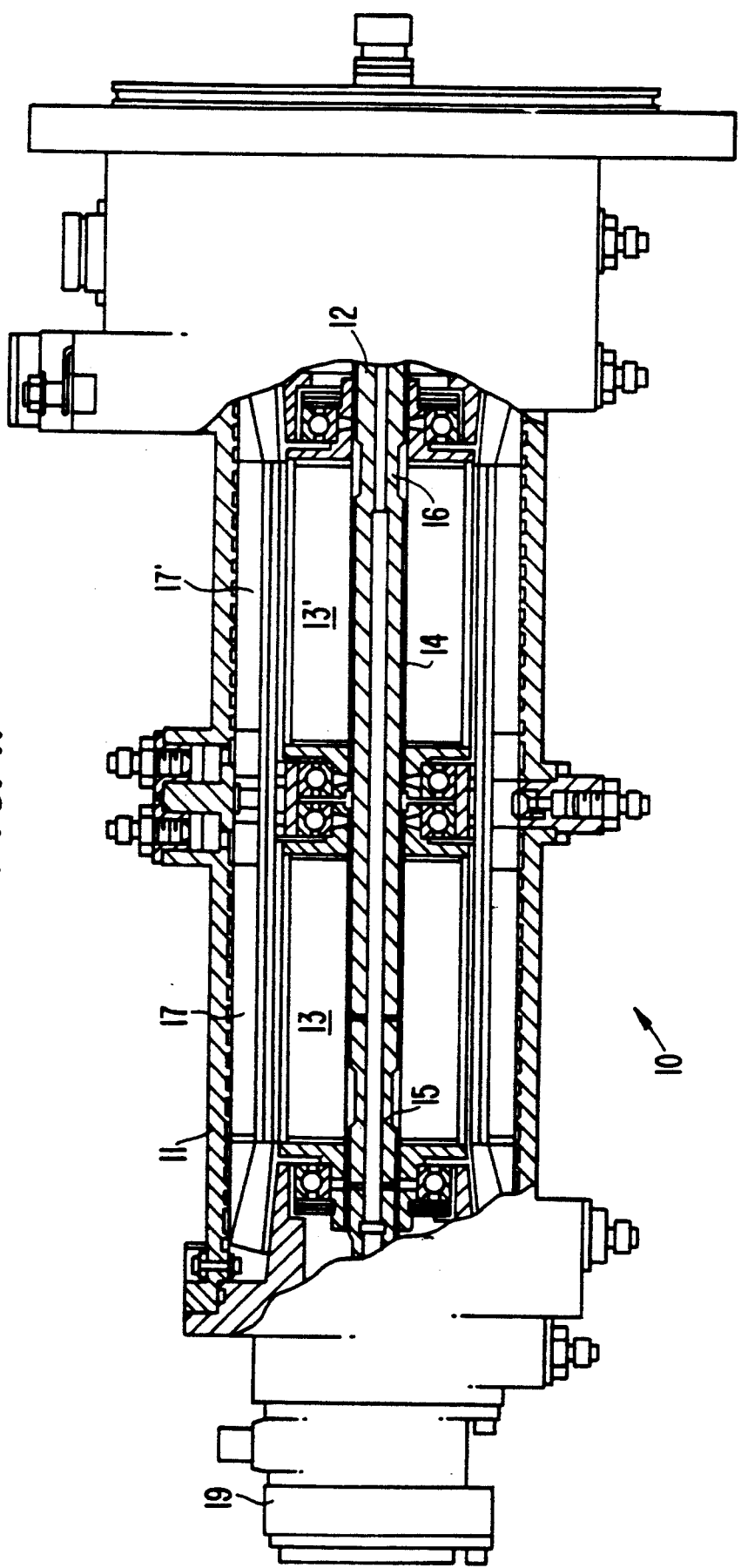
FIG. 1 is an elevational view in partial cross section of a dual permanent magnet generator (PMG) with a differential planetary gear actuator in accordance with the present invention.

Referring now to the drawings and, in particular, to FIG. 1, there is shown a dual PMG designated generally by the numeral 10. Except as is necessary to provide some environment for an understanding of how the present invention can be made and used, the details of the PMG 10 will not be described as they are generally well known as can be seen in, for example, U.S. Pat. No. 4,728,841.

An approximately cylindrically shaped housing 11 is provided for the components of the main generator 10 which includes a centrally located rotating input shaft 12. If, for example, the PMG is to be used in aircraft applications, the input shaft 12 can be driven from a constant speed drive (CSD) which is well known to provide shaft power at a constant speed. Two high speed, main permanent magnet rotors 13, 13' are mounted along with a conventional bearing arrangement with an annular space between the rotors 13, 13' and the shaft 12 except at lefthand helical spline 15 and righthand helical spline 16, respectively, which provide the connection as is described in copending U.S. application Ser. No. 208,114, now U.S. Pat. No. 4,879,484, to cause the main rotors 13, 13' to rotate with the shaft 12 and also to permit the shaft 12 to move axially.

The permanent magnet rotors 13, 13' are located within respective stators 17, 17' having armatures and windings in a known manner. Non-magnetic laminations are provided between the stators to reduce energy losses which would adversely affect generator efficiency. The rotors 13, 13' are axially fixed with respect to their respective stators 17, 17' but are free to rotate about the shaft 12 when the latter moves axially and the helical splines 15, 16 effect a camming action on the rotors 13, 13', respectively.

Figure 2:
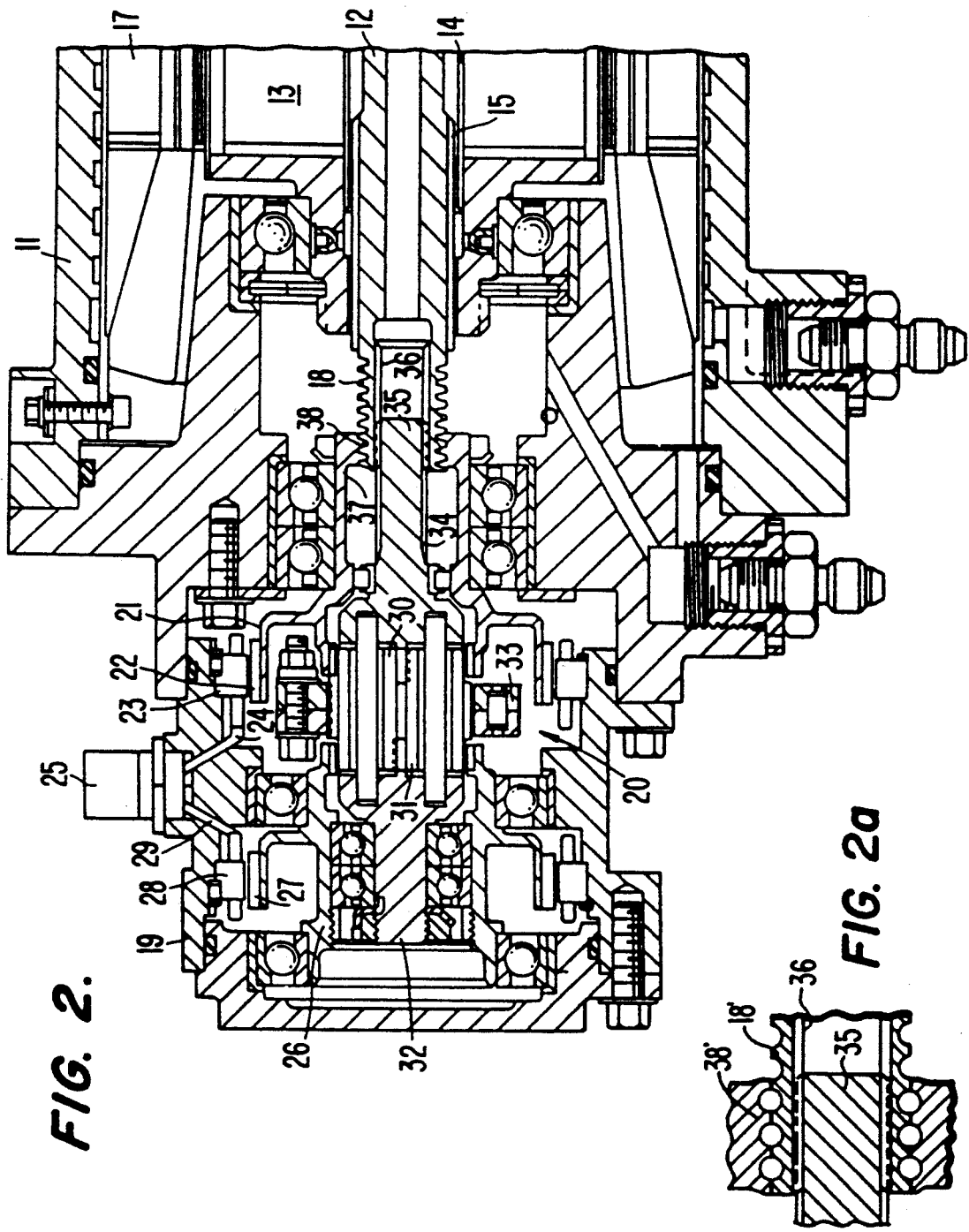

The differential planetary gear actuator shown at the left side of FIG. 1 and in greater detail and larger scale in FIG. 2, is housed in a sub-housing 19 affixed to the main generator housing 11. An acme thread 18 is provided at the left hollowed end of the shaft 12. A 2 planet/2 ring differential planetary gear arrangement of a type similar to known differentials used as a speed control in constant speed drives (CSDs) is designated generally by the numeral 20 and is provided within the sub-housing 19 mounted at the left axial end of the main generator housing 11. One of the ring gears 21 of the differential 20 has a generator permanent magnet rotor 22 fixed thereto and is operatively associated with a generator stator 23. The wiring 24 for the stator 23 leads outside of the sub-housing 19 through a port 25 to a bank of resistors (not shown) through a switch (not shown) so as to selectively place a variable resistive electrical load on the generator associated with the ring gear 21 to actuate phase shifting of the main rotors 13, 13'. Similarly, the other ring gear 26 of the differential 20 has another generator permanent magnet rotor 27 fixed thereto and is operatively associated with another generator stator 28. The winding of the generator stator 28 is likewise connected through wiring 29 to the switching mechanism with a variable load such as a variable resistor load in a conventional manner. The differential 20 has two planet gears 30, 31 which are rotatably journaled within a carrier 32. A one-to-one gear ratio is provided between the ring gear 21 and ring gear 26, and the carrier 32 rotates at the same speed as the input shaft 12 due to a connection in the form of an axial spline 34 at an end 35 of the carrier 32 which is received within the hollow end of the shaft 12 and engages a mating spline 36 in the shaft 12 to prevent relative rotation between the shaft 12 and the carrier 32 but to permit relative axial motion therebetween.

By virtue of a resistive load placed selectively and alternatively on the windings of the generator stator 23 or the generator stator 28, a drag is provided on either ring gear 21 or ring gear 26, which ring gears are rotatably mounted in the main housing 11 and sub-housing 19 through suitable bearings. The ring gear 21 has an axially extending portion 37 adjoining the end of the acme thread 18 on the shaft 12 and is provided with mating acme thread 38 which cooperates with the thread 18 on the shaft 12 to cause axial shifting of shaft 12. The ring gears 21, 26 are also rotatably supported on the carrier 32 in which the planet gears 30, 31 are rotatably journaled.

The foregoing arrangement permits the shaft 12 to be moved axially (to the left and to the right as shown in FIGS. 1 and 2) by application of loads to the windings of one of the generator stators 23, 28 and thereby to slow down the rotation of its associated ring gears 21, 26, respectively.

The slowing of the rotation of either ring gear 21 or ring gear 26 has the effect of causing a relative rotation between the ring gear 21 and the shaft 12. As a result, the mating acme threads 18, 38 will cause the shaft 12 to move either to the left or to the right. By virtue of this movement of the shaft 12, the lefthand and righthand helical splines 15, 16 between the shaft 12 and the main rotors 13, 13' will cause the axially fixed rotors 13, 13' to ride up on the splines 15, 16 by a camming action so as to rotate relative to each other and shift into and out of phase about the axis of the shaft 12, thereby controlling output voltage in response to variations in generator loading. In other words, the main rotors 13, 13' are cammed on the helical splines 15, 16, respectively, to effect clockwise and counterclockwise movement of the rotors depending upon the direction of axial movement of the input shaft 12.

Figure 3:
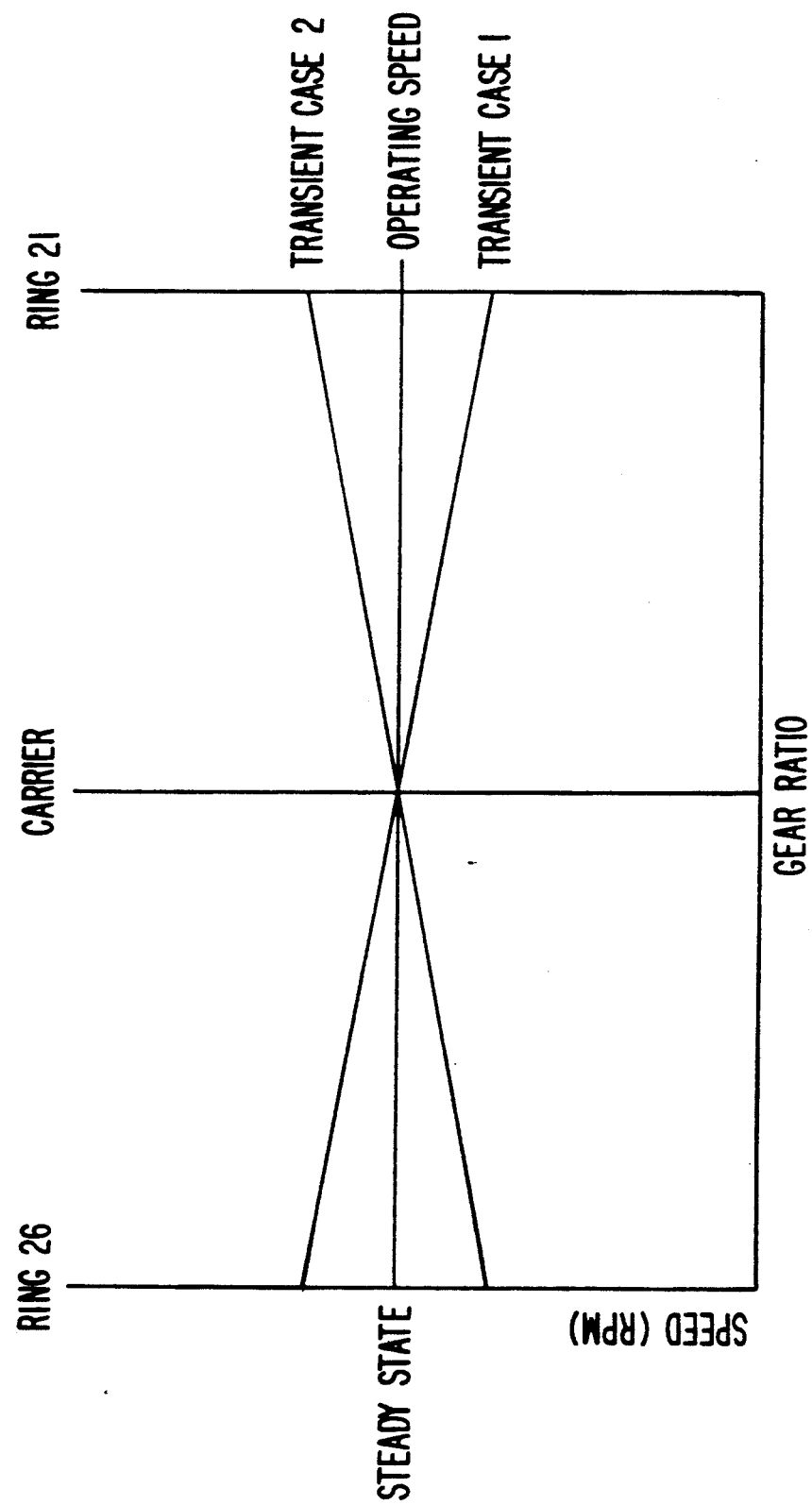
FIG. 3 is a speed nomograph showing the operation of a one-to-one ratio between the ring gears of the actuator of FIG. 2.

During steady state operation of the actuator of FIG. 2, as shown in the speed nomograph of FIG. 3 (as, for example, in a no load condition), the complete differential rotates along with the shaft 12. Assuming now that the actuator goes from a no-load steady state condition to a 1 P.U. full load (shown as Transient Case 1 in FIG. 3) the actuator controller senses a change in the voltage level in a conventional manner and a resistive load is placed on the small generator stator 23. The resulting drag on the ring gear 21 slows it down with respect to the carrier 32 and shaft 12, as shown at the right side of FIG. 2, and via the mating acme threads 18, 38 forces the shaft 12 to move axially with respect to the rotors 13, 13' so that the helical splines 15, 16 will drive the respective main rotors 13, 13' into phase. By virtue of the one-to-one ratio between the ring gears 21, 26, the ring gear 26 will speed up as the other ring gear 21 slows down with the carrier 32 having a constant rotational speed. This process takes about 40 milliseconds and consumes no more than about 1% of the input power on the shaft 12.

Assuming now that the actuator goes from a 1 P.U. load to no load (shown as Transient Case 2 in FIG. 3), a resistive load is placed on the small generator stator 28 associated with ring gear 26 instead of the other generator stator 23 associated with ring gear 21. The resulting drag slows down ring gear 26 but ring gear 21 speeds up causing the input shaft 12 to move axially but in a direction opposite to the axial movement in Transient Case 1.

Figures 4, 4A:
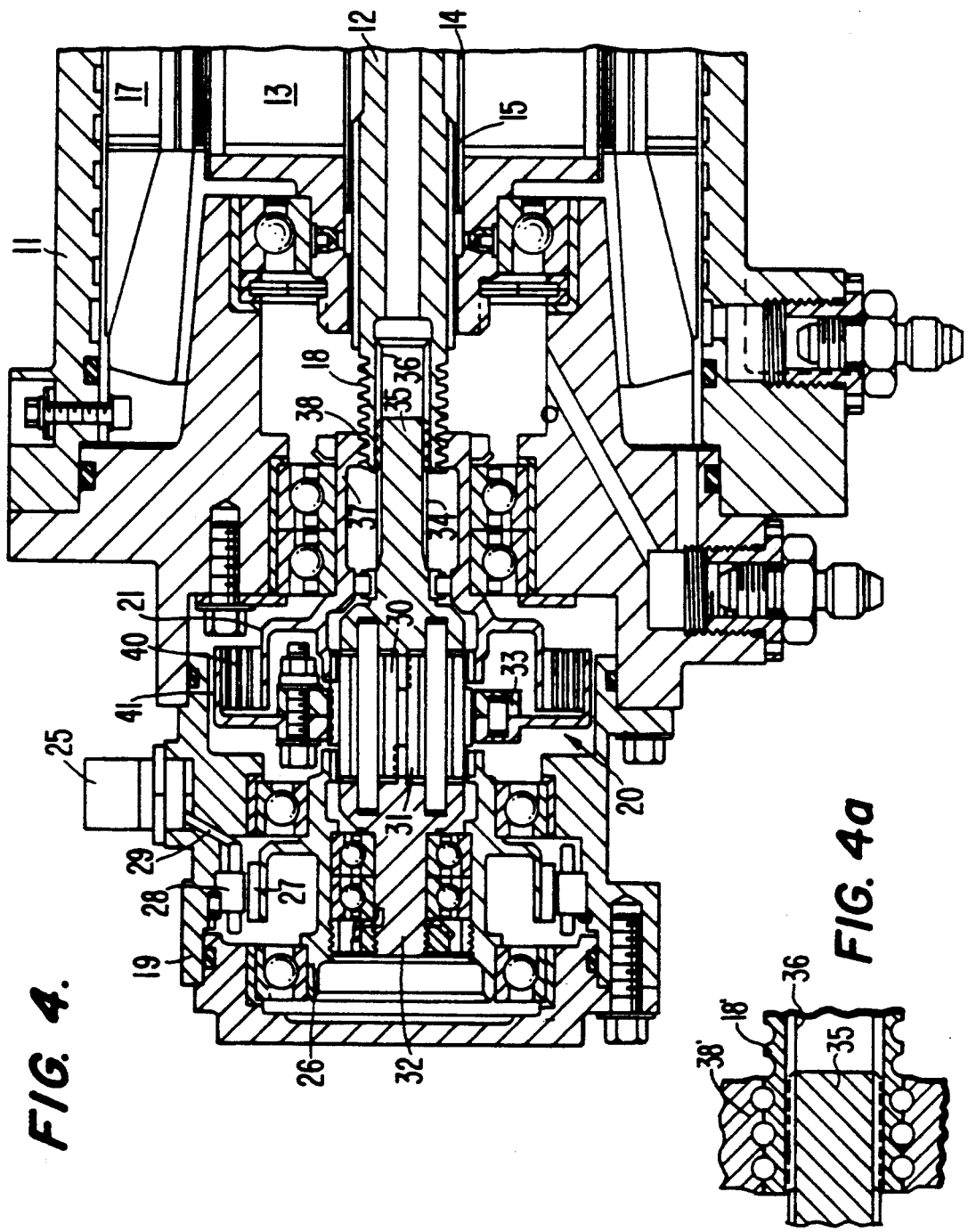
FIG. 4 is another embodiment of an actuator in accordance with the present invention which uses a spiral coil spring to store energy so as to eliminate one of the small generators associated with a ring gear to further simplify the construction of the actuator and FIG. 4A illustrates a fragmentary view of an alterative embodiment.

It is also within the contemplation of the present invention also to use other types of brakes, such as air nozzles and clutches, in lieu of the generator on each ring gear 21, 26. An important criteria for such brakes, however, is that such brakes should be actuatable by extracting power from the actuator 10 rather than by an external power source. For example, one of the small generators associated with the ring gear 21 can be replaced by a coiled spiral spring 40 as shown in FIG. 4 (in which parts similar to the parts shown in FIG. 2 are designated by the same numerals) which in all other essentials is identical to FIG. 2, and the similar structure therefore need not be further described. In this embodiment, the spring 40 is connected at the periphery of the ring gear 21 and an inner peripheral surface of an appendage 41 integral with the carrier bolt flange 33. When a resistive load is placed on the small generator stator 28 associated with ring gear 26, the spiral coil spring 40 is mounted so that it is wound up to store energy. Then when the resistive load is removed from the small generator by opening a switch, the spring 40 unwinds and uses that stored energy to effect braking of the ring gear 21.

Figure 5:
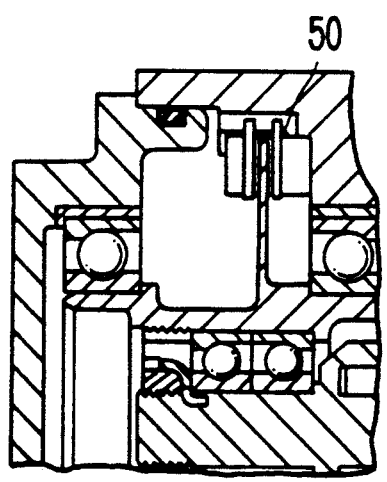
FIG. 5 is an embodiment of an actuator which utilizes a disc brake.

FIG. 5 illustrates another em of the present invention wherein the energy extracting member is a disc brake 50.

While several embodiments have been shown and described, it will be clear to t hose skilled in this art given the above description that these embodiments are susceptible to changes and modifications without departing from the principles of the invention. For example, a rotary ballscrew comprises of threads 18' and 38' as illustrated respectively in FIGS. 2A and 4A may be used in place of the acme threads 18 and 38 of FIGS. 2 and 4. Therefore, it is not intended that the invention be limited to the details shown and described herein but rather that all such changes and modifications as fall within the scope of the appended claims be included.

We claim:

1. A dual permanent magnet generator, comprising a housing, two stators operatively arranged within the housing, two permanent magnet rotors associated with each of the stators and fixed axially with respect to the stators, rotors arranged thereabout, means for connecting the rotors to the input shaft to provide high speed rotation of the rotors and axial shifting of the input shaft, with the rotors axially fixed for rotationally shifting the rotors relative to each other into and out of phase with each other about the axis of the input shaft as generator load varies, and means for extracting power from the input shaft to cause the axial shifting of the input shaft for rotationally shifting the rotors relative to each other including at least one generator and a gear arrangement with the at least one generator applying braking to the gear arrangement which causes the axial shifting of the input shaft.

2. A dual permanent magnet generator according to claim 1, wherein the connecting means comprises helical splines.

3. A dual permanent magnet generator according to claim 2, wherein the helical splines comprise a lefthand spline between one of the rotors and one axial end of the input shaft, and a righthand spline between the other of the rotors and another axial end of the input shaft.

4. A dual permanent magnet generator according to claim 1, wherein the gear arrangement comprises a differential gearing arrangement with two ring gears and the at least one generator associated with the ring gears to provide the braking in the differential gearing arrangement.

5. A dual permanent magnet generator according to claim 4, wherein the at least one generator comprises a generator associated with each ring gear.

6. A dual permanent magnet generator according to claim 4, wherein a spiral coil spring is operatively associated with one of the ring gears, and the at least one generator comprises one generator operatively associated with the other of ring gears.

7. A dual permanent magnet generator according to claim 4, wherein a friction device is operatively associated with one of the ring gears, and the at least one other generator comprises one generator operatively associated with the other of the ring gears.

8. A dual permanent magnet generator according to claim 4, wherein a friction device is operatively associated with each ring gear.

9. A dual permanent magnet operator according to claim 4, wherein the differential gearing arrangement includes a carrier connected with the input shaft to permit the axial shifting, a threaded portion of the input shaft, a first generator rotor mounted on the one of the ring gears in operative relationship with a first stator mounted in the housing for connection with a resistive electrical load, the other of the ring gears having a second generator rotor mounted thereon and in operative relationship with a second stator which is mounted in the housing for connection with a resistive electrical load, and planet gear rotatably mounted in the carrier and in meshing engagement with the ring gears.

10. A dual permanent magnet generator according to claim 9, wherein the connecting means comprises helical splines.

11. A dual permanent magnet generator according to claim 10, wherein the helical splines comprise a lefthand spline between the first rotor and one axial end of the input shaft, and a righthand spline between the second rotor and another axial end of the input shaft.

12. A dual permanent magnet generator according to claim 4, wherein the differential gearing arrangement includes a carrier connected with the input shaft to permit the axial shifting, a threaded portion on one of the ring gears for mating with a threaded portion on the input shaft, a helical coil spring mounted between the one of the ring gears and with a carrier bolt flange which rotates with the carrier, the other of the ring gears having the at least one generator mounted thereon in operative relationship with a stator mounted in the housing for connection to a resistive electrical load, and planet gears rotatably mounted in the carrier and in meshing engagement with the ring gears.

13. A dual permanent magnet generator according to claim 12, wherein the connecting means comprises helical splines.

14. A dual permanent magnet generator according to claim 13, wherein the helical splines comprise a lefthand spline between one of the rotor and one axial end of the input shaft, and a righthand spline between a second rotor and a second axial end of the input shaft.

15. A planetary gear actuator for use in changing a phase relationship between rotors of a dual permanent magnet generator, comprising a housing, a carrier connected with an input shaft of the generator to permit axial shifting of the input shaft and cause the changing in the phase relationship between the rotors, a first ring gear having a threaded portion for mating with a threaded portion on the input shaft, a first generator rotor mounted on a peripheral portion of the first ring gear in operative relationship with a first stator mounted on the housing for connection to a first resistive electrical load for providing a braking force to the first ring gear when the first stator is connected to the first resistive electrical load, a second ring gear, a second generator rotor mounted on a peripheral portion of the second ring gear in operative relationship with a second stator mounted on the housing for connection to a second resistive electrical load for providing a braking force to the second ring gear when the second stator is connected with the second resistive electrical load, and planet gears rotatably mounted in the carrier and in meshing engagement with the first and second ring gears.

16. A planetary gear actuator according to claim 15, wherein the threaded portions comprise acme threads.

17. A planetary gear actuator according to claim 15, wherein the threaded portions comprise a ballscrew.

18. A planetary gear actuator according to claim 15, wherein the first and second generator rotors comprise permanent magnets.

19. A planetary gear actuator for use in changing a phase relationship between rotors of a dual permanent magnet generator, comprising a housing, a carrier connected with an input shaft of the generator to permit axial shifting of the input shaft and causing a change in a phase relationship between the rotors, a first ring gear having a threaded portion for mating with a threaded portion on the input shaft, an energy extracting device mounted on a peripheral portion of the first ring gear in operative relationship with a support which rotates with a carriage, a second ring gear, a generator rotor mounted on a peripheral portion of the second ring gear in operative relationship with a stator mounted on the housing for connection with a resistive electrical load for providing a braking force to the second ring gear and at the same time causing energy to be stored in the energy extracting member, and planet gears rotatably mounted in the carrier and in meshing engagement with the first and second ring gears.

20. A planetary gear actuator according to claim 19, wherein the threaded portions comprise acme threads.

21. A planetary gear actuator according to claim 19, wherein the threaded portions comprise a ballscrew.

22. A planetary gear actuator according to claim 19, wherein the generator rotor comprises a permanent magnet.

23. A planetary gear actuator according to claim 19, wherein the energy shifting member comprises a spiral coil spring.

24. A method for actuating rotors of a dual permanent magnet generator into and out of phase as generator load varies comprising the steps:
   extracting power from an input shaft of the generator by driving a gear arrangement mounted on a carrier with the input shaft;
   applying a load to the gear arrangement from at least one generator associated with the gear arrangement to rotate the rotors into and out of phase via a threaded connection between the gear arrangement and the input shaft.

25. A method in accordance with claim 24 wherein:
   the gear arrangement comprises a two ring gears/two planet gears differential.

* * * * *